Sept. 17, 1935.  E. R. BERGMANN  2,014,610
SHAKER CONVEYER
Filed June 18, 1934  2 Sheets-Sheet 1
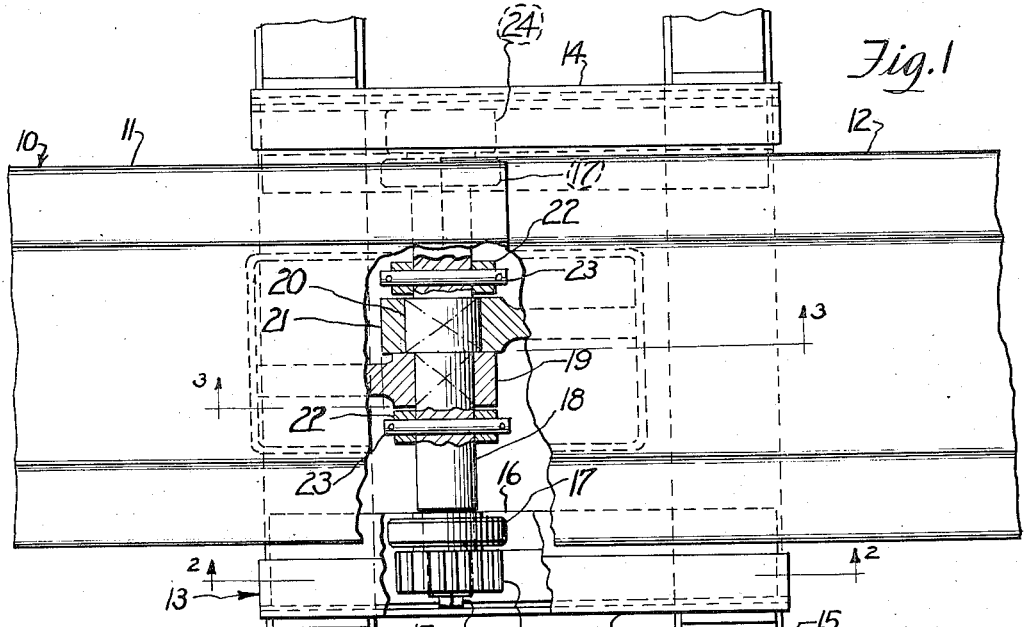
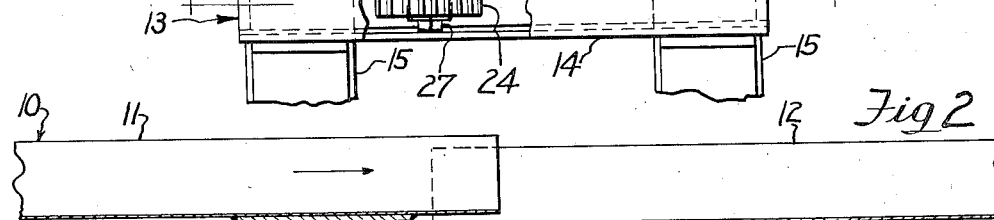
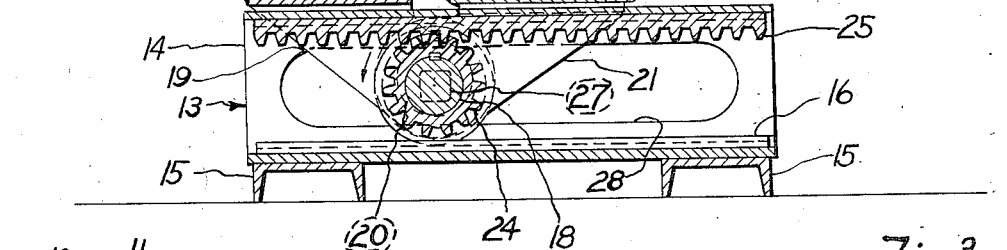
Inventor
Ernst R. Bergmann
Clarence F. Poole
Attorney Sept. 17, 1935.   E. R. BERGMANN   2,014,610
SHAKER CONVEYER
Filed June 18, 1934   2 Sheets-Sheet 2

Inventor
Ernst R Bergmann
Clarence F. Poole
Attorney

Patented Sept. 17, 1935

2,014,610

UNITED STATES PATENT OFFICE 2,014,610

SHAKER CONVEYER

Ernst R. Bergmann, Chicago, Ill., assignor to Goodman Manufacturing Company, Chicago, Ill., a corporation of Illinois Application June 18, 1934, Serial No. 731,035

23 Claims. (Cl. 198—220)

This invention relates to improvements in shaker or jigging conveyers and has as its principal object to provide a power transmitting device of a simplified construction for interchangeably connecting adjacent portions of a conveyer trough or pan line together, so that the violence of the conveying action of the driven section of the pan line may be different than that of the driving section.

My invention may be more clearly understood with reference to the accompanying drawings, wherein:

Figure 1 is a detail plan view of one embodiment of my invention with certain parts broken away and shown in substantially horizontal section;

Figure 2 is a partial longitudinal sectional view taken substantially along line 2—2 of Figure 1;

Figure 3 is a partial longitudinal sectional view taken substantially along line 3—3 of Figure 1, but showing the mechanism in a different position than in Figure 2;

Figure 5:
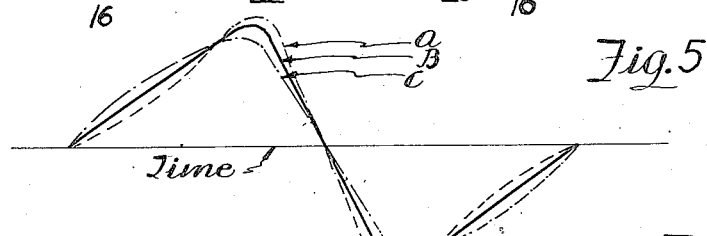

Figure 5 is a diagrammatical view showing several hypothetical velocity curves of a shaker conveyer pan line when efficiently driven for conveying material along the level or up or down grades; and Figures 6, 7, 8 and 9 are diagrammatical views illustrating several arrangements of sections of a pan line with respect to each other and the connections and arrangement of the device of my invention for imparting the required conveying action to the driven section of the pan line.

Like reference characters refer to like parts throughout the several figures.

With reference now in particular to the drawings, the embodiment of my invention illustrated shows the connecting device as being applied to a shaker conveyer trough or pan line 10 adapted to be driven by suitable conveyer drive mechanism (not shown) in an ordinary manner. Said pan line, as herein shown, includes a trough section 11 which may, in some instances, be inclined with respect to the ground and a trough section 12, which may also be inclined with respect to the ground, or the trough section 11. Said trough sections may be any adjacent sections of a pan line which are to be driven with different relative violences with respect to each other.

The drive connecting device, as herein shown, is mounted on a suitable base 13 adapted to be held in fixed relation with respect to the ground by suitable jacks or the like (not shown). Said base includes a pair of inwardly facing channel members 14, 14 arranged in parallel relationship with respect to each other and supported adjacent their ends on suitable cross-members 15, 15 adapted to engage the ground and be held from movement with respect thereto.

The inner sides of the lower flanges of the channel members 14, 14 are provided with shouldered guide members 16, 16 secured thereto and extending therealong and inwardly therefrom a substantial distance. Similarly, the inner sides of the upper flanges of the channel members 14, 14 are provided with shouldered guide members 16a, 16a extending therealong and inwardly therefrom a substantial distance. Said upper and lower guide members are adapted to form a horizontal track and guideway for suitable anti-friction roller devices 17, 17 mounted on a transversely extending shaft 18 adjacent opposite ends thereof. Said roller devices, together with said shaft, form a carrier device for supporting adjacent ends of the troughs 11 and 12 for reciprocable movement along the base 13, as will now be described.

Figure 4:
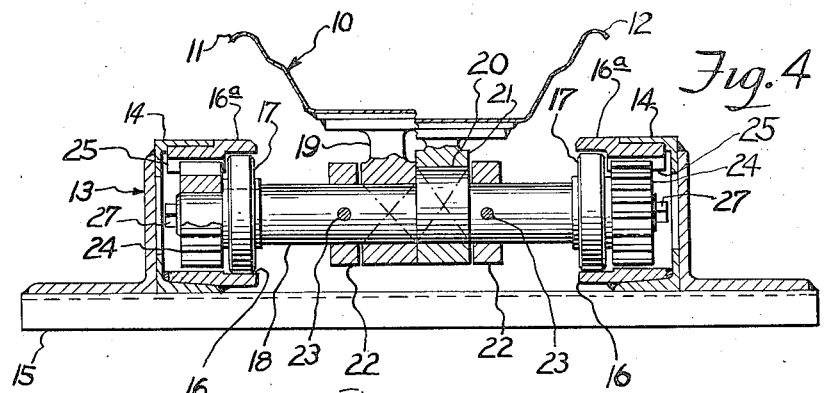
Figure 4 is a transverse vertical sectional view of the embodiment of my invention shown in Figure 1.

The trough section 11 is provided with a depending bored connecting member 19 secured thereto. Said connecting member is journaled on the shaft 18 adjacent one side of the transverse center line thereof and abuts a shoulder formed by an eccentric 20 formed integral with said shaft (see Figure 4). In a like manner, the trough section 12 is provided with a depending bored connecting member 21, which is journaled on the eccentric 20. The connecting member 21 abuts the connecting member 19 adjacent the eccentric 20 and said connecting members are held from lateral movement with respect to said shaft by means of suitable collars 22, 22 abutting the outer sides of said connecting members and secured to said shaft by means of suitable pins 23, 23, in a usual manner.

With reference now in particular to the means for pivotally moving the eccentric 20 and changing the violence of the conveying action of the driven trough section, pinions 24, 24 are keyed to outer ends of the shaft 18. Said pinions mesh with suitable racks 25, 25 formed integral with the inner sides of the upper guide members 16a, 16a adjacent the inside of the web of the channel members 14, 14. It is thus apparent that upon reciprocable movement of the shaft 18 along the base 13 on the roller devices 17, 17 that said shaft will be rotated by the pinions 24, 24 engaging the racks 25, 25. Rotation of said shaft will pivotally move the eccentric 20 about the axis of said shaft and cause an angular displacement of the driven trough section with respect to the driving trough section during various parts of the stroke which will change the violence of the conveying action of said driven trough section.

As herein shown, the arrangement is such that the circumference of the pitch circle of the pinions 24, 24 is equal to twice the length of stroke of the conveyer pan line. Thus, upon each stroke of the pan line, the eccentric 20 is moved one half of a revolution. In order that the proper conveying effect be imparted to the driven trough and the length of stroke of the driven trough be the same as that of the driving trough, the eccentric 20 should be so arranged as to move from one point intersecting a line perpendicular to the rack 25 to another point intersecting said line. As herein shown, said eccentric moves from one extreme position to another and back to its starting point during the forward and return strokes of the conveyer pan line.

It should be understood that variations in diameter of the pinions 24, 24 will increase or decrease pivotal movement of the eccentric 20. A change in diameter of said pinions will not materially affect the drive motion as long as the length of stroke of the driven trough section is not changed; that is, the eccentric 20 must move so that a radial line intersecting its point of greatest eccentricity moves from a line perpendicular to the rack 25 until it again intersects said line during the forward stroke of the conveyer, or until said radial line reaches its starting point in instances where the circumference of the pinion 24 is equal to the length of stroke of the conveyer. Thus, the embodiment of my invention herein illustrated may be used for conveyers having varying lengths of strokes, as long as the eccentric 20 is properly positioned with respect to the forward stroke of the conveyer.

When the trough section 11 is the driving trough section, and it is desired to increase the violence of the conveying action of the trough section 12, the pinions 24, 24, as herein shown, are so arranged with respect to the racks 25, 25 that the eccentric 20 is in an extreme upper position at the start of the forward stroke. When so arranged, said eccentric will move from an extreme upper position to an extreme lower position and back to its starting point during the forward and return stroke of the conveyer pan line.

When the trough 11 is the driving trough section and it is desired to decrease the violence of the conveying action of the driven trough section, the eccentric 20, as herein shown, must be arranged so as to travel from an extreme lower position to an extreme upper position and back to its lower position during the forward and return stroke of the conveyer pan line. Such an arrangement is clearly illustrated in Figure 8.

In order to properly position the eccentric 20 with respect to its associated trough section at the beginning of the forward stroke to either increase or decrease the violence of the conveyer pan line and cause movement of the driven trough in the proper timed relationship with respect to the driving trough, the shaft 18 is provided with squared ends 27, 27. Likewise, longitudinally extending slots 28, 28 are provided in the webs of the channel members 14, 14 to provide access to the ends of said shaft. Thus, the squared ends of said shaft may be engaged by a suitable crank or socket wrench for rotating said shaft and pinions until the eccentric 20 is properly positioned so as to be in an extreme upper or lower position at the beginning of the forward stroke of the pan line depending upon whether the violence of the conveying motion of the driven trough is to be increased or decreased. If desired, suitable marks may be placed on said pinion and racks to indicate when said eccentric is properly positioned with relation to the stroke of the driving trough section.

Referring now in particular to Figures 5 to 9 inclusive, diagrammatically illustrating the various connections between the conveyer trough sections 11 and 12 and the velocity curves of said troughs when connected in several relationships with respect to each other, the velocity curves indicated by reference characters A, B and C in Figure 5, illustrate effective motions for conveying material, such as coal, along the level or up or down an incline.

Figure 6:
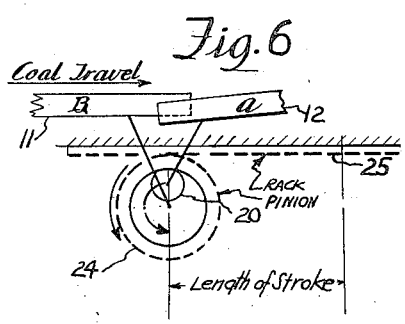

When the driving portion of the pan line is horizontally arranged and the driven portion of the pan line is inclined upwardly with respect thereto, as shown in Figure 6, the conveying effect of the inclined portion of the pan line must be more violent than the level portion of the pan line in order to move material along the entire pan line at a uniform rate. If it is assumed that the left hand trough section shown in Figure 6 is driven by a motion having characteristics similar to those illustrated by curve B in Figure 5, and the eccentric 20 is arranged to travel from an extreme upper to an extreme lower position during the forward stroke of the conveyer, then the conveying action of the driven trough section will be increased as has hereinbefore been described.

Figure 7:
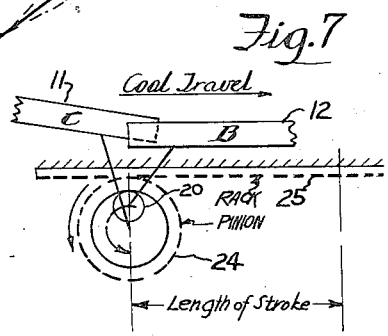

In Figure 7, the trough section 11 is inclined downwardly so as to discharge material into the trough section 12, which is substantially horizontal. In order that the violence of the conveying action of the trough section 11 may be less than that of the trough section 12, the trough section 12 is driven by the conveyer drive mechanism by a motion similar to that indicated by curve B in Figure 5. When the trough section 12 is so driven, pivotal movement of the eccentric 20 will displace the troughs with respect to each other during various parts of the stroke in such a manner as to decrease the violence of the conveying motion of the trough 11 so that it will be driven by a motion similar to that indicated by curve C in Figure 5.

Figure 8:
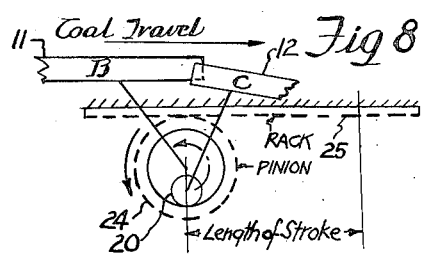

In Figure 8, the trough 11 is the driving trough and is driven by a motion having characteristics similar to those indicated by curve B in Figure 5, and the trough 12 is the driven trough and is inclined so as to convey material downwardly therealong. In order that movement of coal along said trough may be the same as along the trough 11, the violence of the conveying action of said trough is decreased by setting the eccentric 20 so that it moves from an extreme lower to an extreme upper position during the forward stroke of the driving trough.

Figure 9:
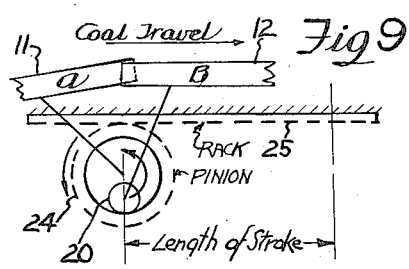

In Figure 9, the trough 12 is arranged horizontally and is driven by a motion similar to that indicated by curve B in Figure 5 and the trough 11 is inclined so as to convey material upwardly therealong and discharge it into said first-named trough. The eccentric 20 is arranged to travel from an extreme lower to an extreme upper position during each forward stroke of the conveyer. This increases the violence of the conveying motion of the trough 11 and said trough is driven by a motion having characteristics similar to those indicated by curve A in Figure 5.

It will be seen from the foregoing, that a number of troughs, or sections of the pan line, may be arranged in several ways with respect to each other to conform to varying grades; that these sections of the pan line may be driven from a single drive mechanism; that the movement of material along said pan line may be substantially constant regardless of whether it is moving up or down grade, or along the level; and that the initial driving mechanism may be such as to drive the pan line at a motion suitable for conveying material along the level. It should be understood that one or more of such power transmission devices may readily be inserted in the pan line at any points where a change in shaking effort is required.

It may further be seen that the change in conveying effort is effected by a simple eccentric connection between the troughs actuated by a simple form of drive mechanism actuated by the conveyer which, as herein shown, includes a rack and pinion.

While I have herein shown and described one form in which my invention may be embodied, it will be understood that the construction and arrangement of the various parts may be altered or changed without departing from the spirit and scope thereof. Furthermore, I do not wish to be construed as limiting myself to the particular form illustrated, excepting as it may be limited in the appended claims.

I claim as my invention:

1. In a shaker conveyer, a conveyer pan line including two conveyer troughs and a connecting device between said troughs for driving one trough from the other with a modified conveying action comprising a stationary base, a rotatable support member guided for reciprocable movement along said base, an eccentric on said member, a transverse pivotal connection between one of said troughs and said member coaxial with the center of said member, a transverse pivotal connection between said other trough and said eccentric and means for rotatably moving said member during each forward and return stroke of the conveyer including a rotatable member arranged concentric with the center of said support member.

2. An apparatus in accordance with claim 1, wherein the eccentric is rotated by means of a pinion on said member and a rack on said base adapted to be meshed with said pinion.

3. In a shaker conveyer, a conveyer pan line including two conveyer troughs and a connecting device between said troughs for driving one trough from the other with a modified conveying action comprising a stationary base, a transverse shaft guided for reciprocable movement on said base, a pivotal connection between one of said troughs and said shaft for movement about an axis coaxial with the longitudinal axis of said shaft, a pivotal connection between said other trough and said shaft to pivot about an axis eccentric of the axis of said shaft, and means for rotating said shaft during each stroke of the conveyer.

4. An apparatus in accordance with claim 1, wherein the shaft is rotated by means of a rack on the base and a pinion on said shaft meshing with said rack.

5. In a shaker conveyer, a conveyer pan line including two conveyer troughs and a connecting device between said troughs for driving one trough from the other with a modified conveying action comprising a stationary base, a member guided for reciprocable movement on said base, an eccentric on said member, a transverse pivotal connection between one of said troughs and said member, a transverse pivotal connection between said other trough and said eccentric and means for rotatably moving said eccentric during each forward and return stroke of the conveyer, and means for increasing or decreasing the conveying action of the driven trough comprising means to permit positioning of said eccentric so that its point of greatest eccentricity at the beginning of the forward stroke of the conveyer is directly opposite its former position at the beginning of the forward stroke of the conveyer.

6. In a shaker conveyer, a conveyer pan line including two conveyer troughs, and a connection between said troughs for driving one trough from the other at a conveying action having a different violence than that of the driving trough comprising a movable pivotal support for an end of one of said troughs including a transverse shaft and an eccentric pivotal support for an end of the other of said troughs including an eccentric rotatable about an axis coaxial with said shaft and means for pivotally moving said eccentric pivotal support simultaneously upon reciprocable movement of said troughs.

7. An apparatus in accordance with claim 6, wherein the means for pivotally moving the eccentric support comprises a stationary member and a rotatable member engageable therewith.

8. An apparatus in accordance with claim 6, wherein the eccentric support is moved from one position intersecting a common line perpendicular to one of said trough sections to another position intersecting said line during the forward stroke of the shaker conveyer and returned during the return stroke, and wherein the means for pivotally moving the eccentric support comprises a stationary member and a rotatable member reacting thereagainst.

9. An apparatus in accordance with claim 6, wherein the means for pivotally moving the eccentric support comprises a stationary rack and a pinion engageable therewith.

10. An apparatus in accordance with claim 6, wherein the eccentric support is moved from one position intersecting a common line perpendicular to one of said trough sections to another position intersecting said line during the forward stroke of the shaker conveyer and returned during the return stroke, and wherein the means for pivotally moving the eccentric support comprises a stationary rack, and a pinion meshing therewith.

11. In a shaker conveyer, a conveyer pan line including two conveyer troughs, and a connection between said troughs for driving one trough from the other at a conveying action having a different violence than that of the driving trough comprising a movable pivotal support for an end of one of said troughs, and an eccentric pivotal support for an end of the other of said troughs, the point of greatest eccentricity of said eccentric pivotal support being movable from one point intersecting a line perpendicular to one of said troughs to another point intersecting said line during each forward stroke of said conveyer and being returned to its starting point during the return stroke thereof, and means for changing the violence of the conveying motion of the driven trough comprising means to permit rotation of said eccentric so that its point of greatest eccentricity at the beginning of the forward stroke of the conveyer is positioned directly opposite its former position at the beginning of the forward stroke of the conveyer.

12. An apparatus in accordance with claim 11, wherein the eccentric is pivoted during each stroke of the conveyer by means of a stationary member including a rack and a rotatable member including a pinion.

13. A power transmitting device for connecting adjacent troughs of a shaker conveyer pan line together whereby one trough may drive the other at a conveying effort different than that of the driving trough comprising a carrier support adapted to support adjacent ends of said troughs for reciprocable movement with respect to the ground, a connection between one of said troughs and said carrier support, an eccentric on said carrier support, means for pivotally moving said eccentric during each stroke of the conveyer, and a connection between said eccentric and said other trough.

14. A power transmitting device for connecting adjacent troughs of a shaker conveyer pan line together whereby one trough may drive the other at a conveying effort different than that of the driving trough comprising a carrier support adapted to support adjacent ends of said troughs for reciprocable movement with respect to the ground, a connection between one of said troughs and said carrier support, an eccentric on said carrier support, means for pivotally moving said eccentric during each stroke of the conveyer, comprising a stationary member, and a rotatable member operatively connected with said eccentric and reacting against said stationary member whereby reciprocable movement of said driving trough will rotate said rotatable member.

15. A power transmitting device for connecting adjacent troughs of a shaker conveyer pan line together whereby one trough may drive the other at a conveying effort different than that of the driving trough comprising a carrier support adapted to support adjacent ends of said troughs for reciprocable movement with respect to the ground, a connection between one of said troughs and said carrier support, an eccentric on said carrier support, means for pivotally moving said eccentric during each stroke of the conveyer comprising a stationary rack and a pinion operatively connected with said eccentric and engageable with said rack whereby reciprocable movement of said drivng trough will rotate said pinion.

16. In a shaker conveyer, a conveyer trough, a second conveyer trough, and a connection between said troughs whereby one trough may be driven by the other and the conveying motion of the driven trough may be different than that of the driving trough comprising a carrier member, a pivotal connection between one of said troughs and said carrier member, said carrier member including an eccentric, a pivotal connection between said eccentric and said other trough and means for moving said eccentric about an axis coaxial with the axis of pivotal connection of said first trough to said carrier member during each stroke of the conveyer comprising a stationary member and a rotatable member operatively connected with said carrier member and reacting against said stationary member.

17. An apparatus in accordance with claim 16, wherein the stationary member includes a rack and the rotatable member includes a pinion meshing with said rack.

18. In a shaker conveyer, a conveyer trough, a second conveyer trough, and a connection between said troughs whereby one trough may be driven by the other and the conveying motion of the driven trough may be different than that of the driving trough comprising a base adapted to be held in fixed relationship with respect to said trough sections, a carrier member having rollers thereon guided for movement along said base, a pivotal connection between one of said conveyer troughs and said carrier member, said carrier member including an eccentric, a pivotal connection between said eccentric and said other trough and means for reciprocably pivoting said eccentric during the forward and return strokes of the conveyer.

19. An apparatus in accordance with claim 18, wherein the eccentric is pivotally moved by means of a rack on said base and a pinion movable with said carrier member and engageable with said rack.

20. In a shaker conveyer, a conveyer pan line including two conveyer troughs and a connecting device between said troughs for driving one trough from the other with a different conveying action comprising a rotatable support member, a rolling member forming a support means for said support member, a transverse pivotal connection between one of said troughs and said support member coaxial with the center of rotation of said rolling member, a transverse pivotal connection between said other trough and said support member eccentric of the center of rotation of said rolling member, and means for rotatably moving said support member during each forward and return stroke of the conveyer about an axis coaxial with the axis of rotation of said rolling member.

21. An apparatus in accordance with claim 20, wherein the rotatable support member is rotated by means of a pinion thereon and a stationary rack adapted to be meshed with said pinion.

22. In a shaker conveyer, a conveyer pan line including two conveyer troughs and a connecting device between said troughs for driving one trough from the other with a different conveying action comprising a rotatable support member, a pair of coaxial rolling members arranged coaxial with the axis of rotation of said support member for supporting said support member for movement with said pan line, a transverse pivotal connection between one of said troughs and said support member coaxial with the axis of rotation of said rolling members, a transverse pivotal connection between said other trough and said support member eccentric of the axis of rotation of said rolling members, and means for rotatably moving said support member about its axis of pivotal connection with said rolling members during each forward and return stroke of the conveyer.

23. An apparatus in accordance with claim 22, wherein the support member is rotated by means of a pinion thereon and a stationary rack adapted to be meshed with said pinion.

ERNST R. BERGMANN.